United States Patent Office 3,005,671
Patented Oct. 24, 1961

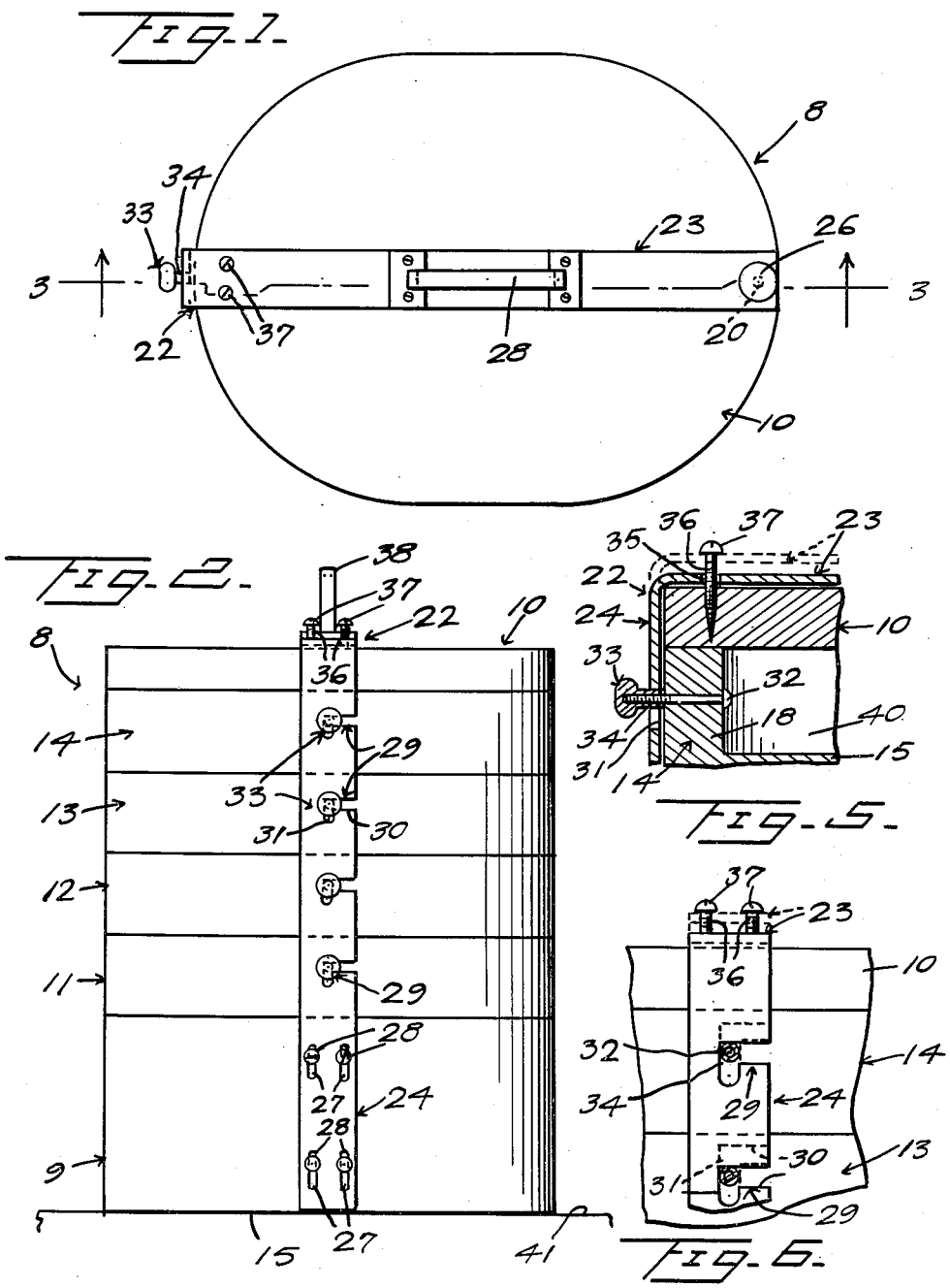

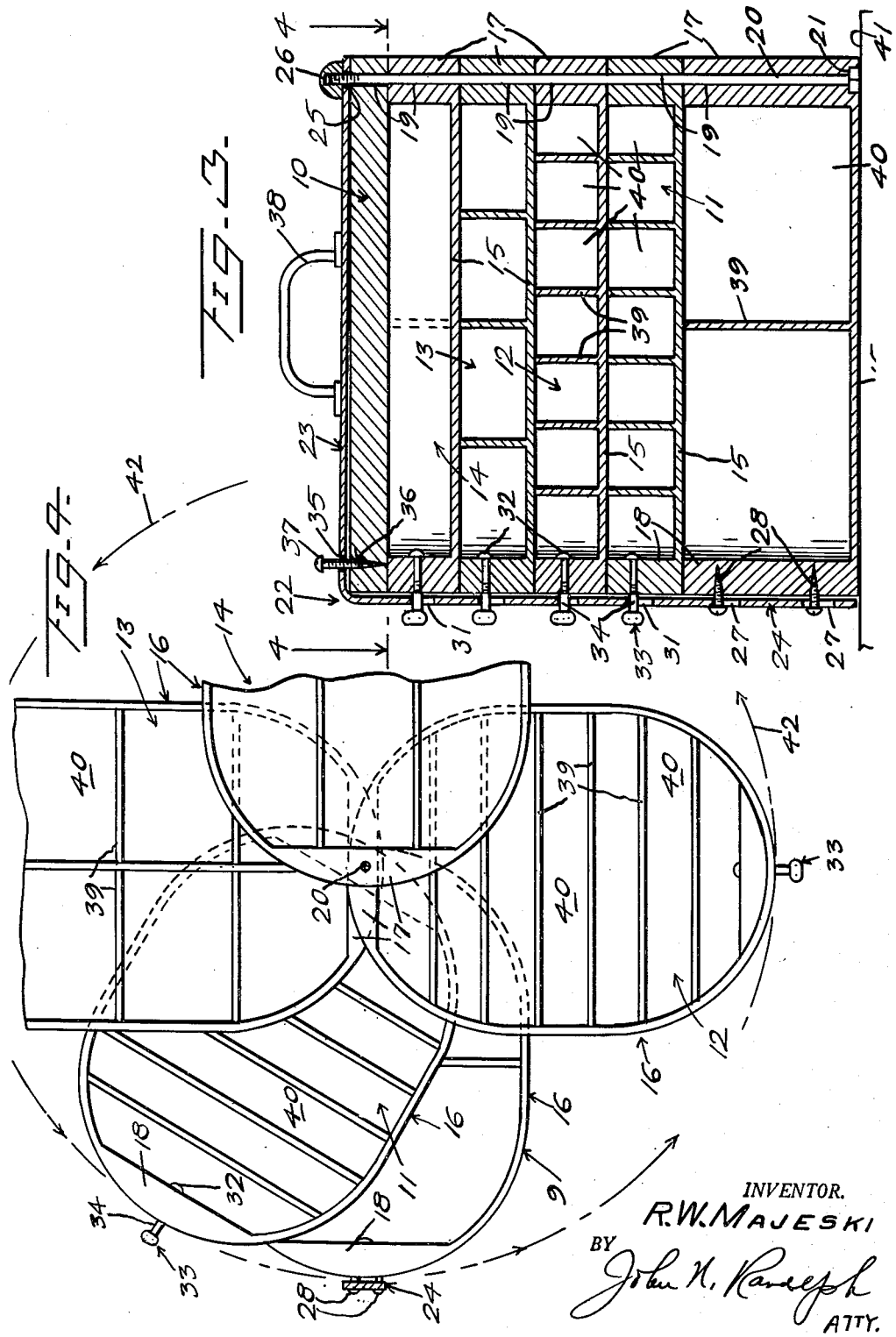

3,005,671
TACKLE BOX WITH SUPERPOSED TRAYS
Robert W. Majeski, Santa Barbara, Calif.
(P.O. Box 192, Temecula, Calif.)
Filed Jan. 29, 1960, Ser. No. 5,450
7 Claims. (Cl. 312—216)

This invention relates to a novel fishing tackle box composed of a plurality of superposed trays which are swingably connected together so that the several trays or sections of the box can be swung to open positions for simultaneously exposing the interiors of the several trays.

Another object of the invention is to provide a tackle box having a novel means for automatically latching the trays of the box in a closed position when the box is supported for carrying by the handle thereof and for unlatching the trays automatically when the tackle box is placed in an upright position on a supporting surface.

Still another object of the invention is to provide a tackle box of extremely simple construction which may be economically manufactured and sold, which will be durable and efficient in use, and which is capable of holding a large quantity of fishing equipment in a conveniently accessible manner.

Various other objects and advantages of the invention will hereinafter become more fully apparent from the following description of the drawings, illustrating a presently preferred embodiment thereof, and wherein:

FIGURE 1 is a top plan view showing the tackle box closed;

FIGURE 2 is a front elevational view thereof, looking from left to right of FIGURE 1;

FIGURE 3 is a substantially central vertical sectional view taken substantially along the line 3—3 of FIGURE 1;

FIGURE 4 is a fragmentary horizontal sectional view, on a somewhat reduced scale, taken substantially along a plane as indicated by the line 4—4 of FIGURE 3 and showing the several tackle box trays swung to open positions;

FIGURE 5 is an enlarged fragmentary vertical sectional view of a part of the tackle box, and FIGURE 6 is an enlarged fragmentary front elevational view of the part of the tackle box illustrated in FIGURE 5.

Referring more specifically to the drawings, the fishing tackle box in its entirety is designated generally 8 and includes a bottom tray section 9, a top plate 10 and a plurality of trays which are interposed between the bottom tray 9 and the top plate 10. As illustrated, four trays 11, 12, 13 and 14 are shown arranged in superposed relation relative to one another upon the bottom tray 9. The top plate 10 is generally oval shaped, as seen in FIGURE 1, and each of the trays, including the bottom tray 9, is of the same size and shape in top plan or outline, as the top plate 10.

Each of the trays, including the bottom tray 9, has a substantially flat bottom 15 and a continuous upstanding surrounding marginal wall 16. The marginal walls 16 are of the same size and shape in top plan or outline and each includes the internally thickened end portions 17 and 18. The height of the surrounding walls 16 may vary. As illustrated, the surrounding wall 16 of the bottom tray 9 extends to a greater height than the surrounding walls 16 of the other trays, so that the bottom tray 9 is deeper than the trays 11-14. The trays 11-14 are shown of the same depth; however, the depth of these trays could vary.

The thickened end portions 17 have bores 19 extending centrally therethrough, and one end of the top plate 10 is also provided with a bore 19. When the trays are stacked one upon the other and with the top plate 10 disposed thereabove, as seen in FIGURES 1 and 2, the bores 19 of said trays and top plate are disposed in alignment to receive a bolt 20 which extends upwardly therethrough and which is preferably provided with a noncircular head which seats nonturnably in a recess 21 of the bottom 15 of the bottom tray 9, as seen in FIGURE 3.

A metal strap member 22 is composed of two end portions 23 and 24 which form approximately a right angle with one another. The strap portion 23 is provided with an opening 25 adjacent its distal end through which the threaded upper end of the bolt 20 loosely extends. A cap nut 26 threadedly engages the upper end of the bolt 20 and bears against the upper side of the strap portion 23. Said strap portion 23 extends lengthwise across the upper side of the top plate 10 from the bolt 20 and the strap portion 24 extends downwardly along the outer sides of the wall portions 18, which constitute the front of the tackle box 8.

Said strap portion 24, near its lower end, is provided with a plurality of longitudinally elongated slots 27. Headed screws 28 extend inwardly through the slots 27 and are anchored in the wall portion 18 of the bottom tray 9, so that portions of the screw shanks loosely engage in the slots 27 to permit an up and down sliding movement of the strap portion 24 relative to said bottom tray 9. Contiguous with the wall portion 18 of each of the trays 11-14, the strap portion 24 is provided with an angular notch 29 including a substantially horizontal upper leg 30 and a depending vertical leg 31. The horizontal legs 30 of the notches 29 all open outwardly of one longitudinal edge of the strap portion 24 and the vertical legs 31 extend downwardly from the opopsite inner ends of said legs 30, as best seen in FIGURE 6.

A screw 32 extends outwardly through the front wall portion 18 of each of the trays 11-14, as best seen in FIGURE 5. A small knob 33 is threadedly connected to the exposed outer end of each screw 32. Each knob 33 includes a slender shank 34 which bears against and extends outwardly from the exterior surface of the front wall 18 and which is of a cross sectional size to loosely engage either leg 30 or 31 of the notch 29 individual thereto, as seen in FIGURES 2 and 6.

The strap portion 23, remote from its opening 25, is provided with transversely spaced openings 35 through which shank portions of screws 36 loosely extend. The screws 36 are anchored in and extend upwardly from the top plate 10 and have heads 37 which are larger than the openings 35 and which are normally spaced from the strap portion 23, as seen in FIGURE 3. The strap portion 23 is provided with an upstanding bail-type handle 38 which is disposed approximately midway of its ends and between and spaced from the openings 35 and the opening 25, and which may be secured in any conventional manner rigidly to the strap portion 23.

Each of the trays 9, 11-14 is provided with one or more partitions 39, which partition or partitions may extend lengthwise and/or crosswise of the tray for dividing the individual trays into two or more article receiving compartments 40. The size and shape of the various compartments of the different trays will vary depending upon the number, spacing and arrangement of the partitions of said tray. It will also be understood that a greater or lesser number of trays than as illustrated and described can be provided between the bottom tray 9 and the top plate 10.

FIGURES 1, 2, 3, 5 and 6 illustrate the relationship of the parts of the tackle box when the bottom 15 of the bottommost tray 9 is resting upon a supporting surface 41. When thus disposed, the strap member 22 will be in a normal position with the shanks of the screws 28 adjacent the upper ends of the slots 27, in which said screw shanks engage, so that the knob shanks 34 will engage in the junctions of the inner ends of the horizontal legs and the upper ends of the vertical legs of the angular notches 29. Accordingly, by gripping any one of the knobs 33, the shank thereof can be swung to the right, as seen in FIGURE 2, out of engagement with the notch leg 30 and so that the tray to which said knob is connected can be swung counterclockwise, as seen in FIGURE 1, to an open position about the bolt 20. In this manner the four trays 11–14 can be swung to open positions as illustrated in FIGURE 4 so that parts of the interiors of all of the trays will be exposed at the same time. This counterclockwise movement of the trays to their open positions is illustrated by arrows 42 in FIGURE 4. By swinging the trays 11–14 in the opposite direction or clockwise from their positions of FIGURE 4, the trays can be returned to their closed positions as seen in FIGURES 1 and 2. While the bottom tray 9 is not swingable from a position directly beneath the top plate 10, when the intermediate trays 11–14 are swung to open positions the compartments 40 of the bottom tray 9 will be exposed and accessible.

With the tackle box 8 closed, as seen in FIGURES 1 and 2, the handle 38 can be grasped for lifting and carrying the tackle box. As the tackle box is lifted from the surface 41 by the handle 38 the strap member 22 will spring upwardly from its full line to its dotted line position of FIGURES 5 and 6 so that the knob shanks 34 will then engage in the lower portions of the vertical notch legs 31. Thus, while the tackle box 8 is being carried by the handle 38 the trays 11–14 are latched in closed positions. When the tackle box 8 is replaced on a supporting surface 41 the strap member 22 will return to its position of FIGURES 2 and 3 and its full line position of FIGURES 5 and 6, previously described, so that the trays 11–14 can be swung to open positions by merely engaging and moving the knobs 33 from left to right as seen in FIGURE 2. When the tackle box 8 is being carried by the handle 38 parts of the strap portion 23 will bear against the undersides of the screw heads 37, as illustrated in dotted lines in FIGURES 5 and 6, so that no part of the weight of the tackle box will be supported by the lower ends of the notch legs 31 engaging the knob shanks 34.

Various modifications and changes are contemplated and may be resorted to, without departing from the function or scope of the invention as hereinafter defined by the appended claims.

I claim as my invention:

1. A container comprising a bottom tray, a top plate and at least one intermediate tray, said parts being symmetrical in outline and being disposed in superposed stacked relation with said intermediate tray resting on the bottom tray and disposed beneath the top plate, a pivot element extending vertically through said trays and top plate and disposed adjacent a marginal portion of the container, an angular metal strap having a first end portion and a second end portion, said first end portion extending along the upper side of the top plate, said second end portion extending from top to bottom of the container and being disposed remote from said marginal portion, means connecting said second end portion to the bottom tray remote from said pivot element, means connecting said first end portion to the top plate, said intermediate tray being swingable about said pivot element as an axis and relative to the bottom tray and top plate for exposing the interiors of said trays, and latch means including a part associated with and carried by said intermediate tray and a part associated with said second end portion and detachably receiving the part carried by the intermediate tray for latching the container in a closed position with said intermediate tray disposed between and symmetrical to the bottom tray and top plate.

2. A container as in claim 1, said trays and top plate each being elongated in outline, said pivot element extending through the trays and top plate adjacent corresponding ends thereof and said second end portion being disposed beyond the other ends of the trays and top plate.

3. A container as in claim 1, said means connecting the strap member to the bottom tray and top plate providing a loose connection for up and down movement of the strap member relative to the trays and top plate, said part of the latch means associated with said second end portion comprising an angular notch having a top horizontal part opening outwardly of a side edge of said second end portion and a vertical part extending downwardly from an inner end of said top part, said part of the latch means carried by the intermediate tray including an outwardly extending shank swingably movable into and out of engagement with said top portion of the notch, when the strap member is in a lower position thereof, and engageable in said depending portion of the notch when the strap member is displaced upwardly for latching the tray in a closed position in said last mentioned raised position of the strap member.

4. A container as in claim 3, said first mentioned end portion having an upstanding carrying handle manually engageable for initially raising the strap member relative to the trays and top plate, for latching the container parts in a closed position, and for thereafter lifting and supporting the container.

5. A container as in claim 1, said pivot element, strap member and said means connecting the strap member to the bottom tray and top plate cooperating to connect said top plate and bottom tray immovably to one another to provide a space therebetween in which said intermediate tray is swingably received.

6. A container as in claim 1, and a plurality of additional intermediate trays interposed between said bottom tray and top plate, each of said intermediate trays being individually swingable about said pivot element between open and closed positions, and said latch means including parts for latching each of said intermediate trays simultaneously to said second end portion of the strap member.

7. A container comprising a bottom tray, a top plate and at least one intermediate tray, said parts being symmetrical in outline and disposed in superposed stacked relation with said intermediate tray resting on the bottom tray and disposed beneath the top plate, a pivot element extending vertically through said trays and top plate and disposed adjacent a marginal portion of the container, a strap having a part extending from top to bottom of the container and disposed remote from said marginal portion, means connecting said part to the bottom tray for limited vertical sliding movement of the strap relative to the container, a latch element fixed to and projecting outwardly from a part of said intermediate tray, said strap having an angular notch including a horizontal top portion in which said latch element is swingably received and a depending vertical portion, and a carrying handle attached to another part of said strap for initially lifting the strap relative to the container, when an upward pull is exerted on the handle, for displacing said vertical notch portion into engagement with the latch element for latching the intermediate tray in a closed position prior to lifting of the container by the handle.

References Cited in the file of this patent

UNITED STATES PATENTS

| | | |
|---|---|---|
| 1,289,657 | Cheney | Dec. 31, 1918 |
| 2,563,718 | Gifford | Aug. 7, 1951 |
| 2,628,752 | Corkish | Feb. 17, 1953 |
| 2,718,447 | Wright | Sept. 20, 1955 |